Sept 8, 1925.

E. J. KILEY

VALVE

Filed May 4, 1925

1,552,614

Witness:- Robert N. Schaefer

Inventor
Edward J. Kiley

By
Attorney

Patented Sept. 8, 1925.

1,552,614

UNITED STATES PATENT OFFICE.

EDWARD J. KILEY, OF MANSFIELD, OHIO, ASSIGNOR TO THE OHIO BRASS COMPANY, OF MANSFIELD, OHIO, A CORPORATION OF NEW JERSEY.

VALVE.

Application filed May 4, 1925. Serial No. 27,683.

*To all whom it may concern:*

Be it known that I, EDWARD J. KILEY, a citizen of the United States of America, residing at Mansfield, in the county of Richland and State of Ohio, have invented certain new and useful Improvements in Valves, of which the following is a specification.

My invention relates to valves and particularly to that class of valves known as gate valves.

The object of my invention is to provide a one-piece gate for use with a gate valve body which will adjust itself readily to the angle of the body seats and which will maintain a uniformly tight fit with the body seat and which will be cheap and efficient.

The majority of gates at the present date comprise two or more pieces in which the discs forming the seats of the gate are relatively movable with respect to each other about a pivotal point so that the discs may adjust themselves with the seats on the body or the gates may be made of a solid construction, and depending upon the accuracy in machining the seats of the body and gate to produce a tight fit and to maintain the same.

In my invention I have provided a one-piece gate which is so constructed that it will adjust itself to the body seats and which I find will maintain such adjustment. Adjustment of the solid gate referred to above is impossible and it is a very short time before it shows leakage. With the multi-part gates, while they are adjustable to the body seats, they are more expensive to manufacture and are not considered as good a manufacturing proposition as a single piece gate due to the number of pieces and equipment necessary to manufacture.

My invention resides in the new and novel construction, combination and relation of the various parts herein more fully described and shown in the accompanying drawing.

Figure 1:
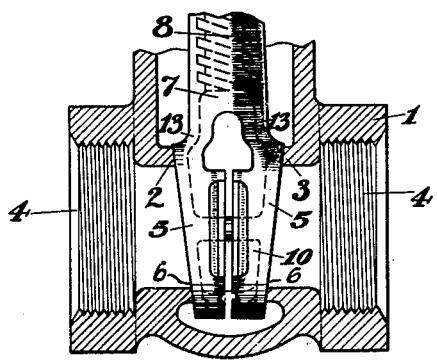
Fig. 1 shows a sectional view of a portion of a standard body used in gate valves and shows a gate of my improved type in full view. This view is taken on a plane coinciding with the axes of the operating stem and the inlet and outlet openings.
Figure 2:
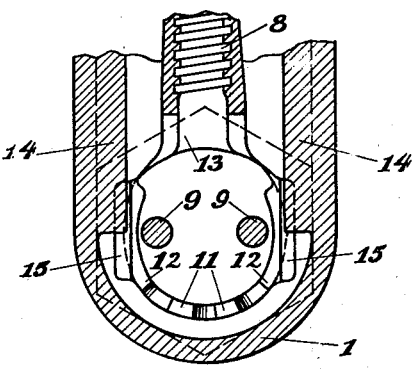
Fig. 2 is a view in section of the complete gate, but of a portion of the valve body, and in a plane at right angles to the axes of the inlet and outlet openings, but coinciding with the axis of the operating stem.
Figure 3:
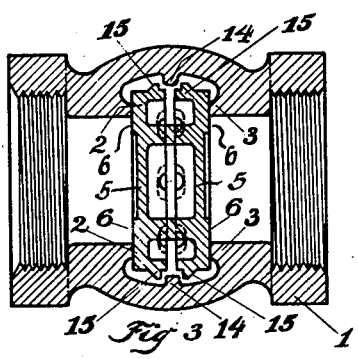
Fig. 3 is a section of the valve body and gate taken on a plane coinciding with the axes of the inlet and outlet openings, but at right angles to the axis of the operating handle.

I have not shown an entire valve body with the bonnet, packing gland, operating stem and handle, as a valve of this type is standard on the market and in extensive use at the present day.

I prefer to employ a body of the standard type on the market at the present day and which I designate by the numeral 1. This body is provided with oppositely disposed seats 2 and 3 and these seats are machined so that their planes will form an angle of divergence with its greater opening toward the valve bonnet. Seats of this character will permit of a wedging action with the seats on the gate when the valve is being closed, thereby tending to form a tight fit between the gate and the body seats. The body, of course, is formed with an inlet and an outlet and these inlet and outlet openings are formed with threads 4 to receive the pipe connections.

The gate which I prefer to employ and which embodies my invention comprises two disc portions 5 and each is provided with a machined face or seat 6 arranged to engage with the seats 2 and 3 on the valve body. The discs 5 are provided at their upper end with a stem receiving boss 7 threaded internally as at 8 to receive a threaded operating stem with a handle thereon by means of which the gate is raised or lowered by revolution of the stem in one direction or the other. The discs 5 are connected by means of two ligatures 9 spaced apart and inwardly from the edges of the discs but so as to permit the operating stem to pass therebetween in raising the gate to an open position. These ligatures 9 integrally connect the oppositely disposed discs 5 upon a transverse central line with respect to the machined seats 6 on the discs 5 but may be otherwise positioned. In casting the gate the central cavity 10 is formed with a core, but this core does not separate the discs 5 entirely around their edges, but leaves the edges of the discs connected at the points 11 and 12 as well as connected by means of the ligatures 9 and neck portions 13 which connect the boss 7 with the discs 5. These connections will give the disc, when it is cast, a substantially solid construction so far as the discs 5 are concerned with respect to their relative movability. This connecting or tying together of the discs 5 around their edge permits the faces 6 of the discs 5 to be machined without any springing or yielding of the discs relative to each other thereby permitting the faces 6 of the gate to be machined accurately to the angle desired. After the faces 6 of the discs 5 have been properly machined and the boss 7 threaded then the portions 11 and 12 which tie the edges of the discs together are separated by cutting through them with a narrow saw or by other proper means and entirely separating the discs from each other with the exception of the ligatures 9 and the neck portions 13.

This construction I find permits the yielding of the discs about the ligatures 9 and while the discs are tied together by the neck 13 I construct the necks 13 so that they do not hold the discs 5 absolutely rigid, but will permit the upper portion of the discs 5 to move inwardly and outwardly very slightly relative to each other. I find that having the boss 7 connected to each of the discs will give a better construction than if the boss 7 were connected to one of the discs 5 only as would be the case if one of the necks 13 were cut through so as to make one of the discs 5 independent of the boss 7. Such a construction throws all of the connection between the boss 7 and discs 5 upon one neck 13 only and I have found it impractical to make the single neck 13 as strong as necessary, but by connecting the boss 7 to each of the discs 5 by its own neck 13, I am able to provide a gate which will give me the necessary relative movements of the discs 5 for adjustment purposes with respect to the body seats 2 and 3.

Figures 4, 5, 6:
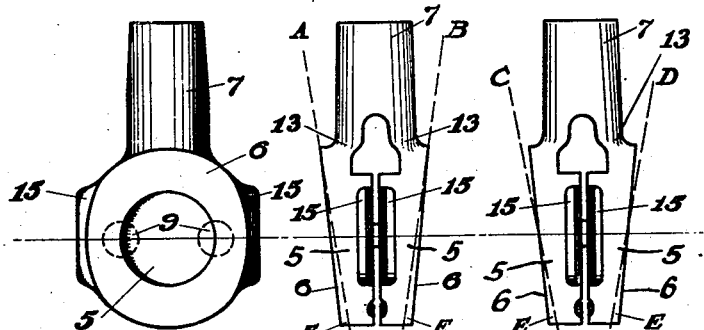
Fig. 4 is a side view in elevation of my improved gate.
Fig. 5 is an edge view of Fig. 1 showing a certain relation of the face of the gate to the face of the body seats.
Fig. 6 is a side view of Fig. 4 showing a relation between the faces of the gate and the body seats, but differing from that shown in Fig. 5.

In machining the faces 6 of the discs 5 I prefer to make the lower portion "hard" with respect to the faces 2 and 3 of the body discs. Referring to Fig. 5, if the lines A and A', B and B' represent the planes of the valve seats 2 and 3 on the body, then it will be noted that the seats or faces 6 on the gate project outside the planes represented by the lines A—A' and B—B' and that when a gate of this construction is inserted in a valve body, the seats of which correspond with the lines A—A' and B—B', and the gate is moved to a seating relation with respect to the body seats, the lower portion of the discs 5 will first be moved inwardly and this will take place about the ligatures 9 which tend to maintain the central portion of the discs 5 in a fixed spaced relation and as the downward movement of the gate continues the edge of the discs above the bottom also moves inward and this inward movement continues from the bottom of the discs upwardly as the gate moves downward at the same time the upper portion of the discs 5 will tend to move outward slightly or into a more intimate relation with the upper portion of the seats 2 and 3 of the valve body. I have found that a relation of the seats on the gate and on the valve body as just described will give a seating relation much superior to that secured by machining the faces 6 of the discs 5 so that their planes will coincide with the planes of the seats 2 and 3 on the body member. In the construction just described and shown in Fig. 5, it will be noted that the upper edge of the seats 6 coincide with the line A—A' and B—B' while the lower edge of the seats 6 project outwardly from these lines which gives a "hard" fit between the gate and the body seats 2 and 3 when the gate is being originally installed, and as the gate moves to its final position and the edges of the discs 5 move inwardly or toward each other and adjust themselves with relation to the seats 2 and 3 on the body, the upper edge of the seat 6 will tend to move outward slightly or become "hard" with relation to the seats 2 and 3 on the body, thus permitting all parts of the discs 5 to adjust themselves with relation to the seats 2 and 3 on the body 1.

A construction of the parts as described and a forced springing inward of the edges of the discs 5 as the gate moves to its final position and a possible slight springing outward of the discs at their upper edges adjacent the necks 13 gives a far more reliable seating relation between the gate and body seats than with a solid gate in which a slight difference between the machining of the body and gate seats means a leaky valve. When the faces 6 of the discs 5 engage the seats 2 and 3 throughout their arcs of contact the gate will be fully seated and estopped from further downward movement.

In Fig. 6 the same principle holds true, in that, the lower edge of the discs 5 are hard with respect to the lines C—C' and D—D', which represent the planes of the body seats 2 and 3, but in this case the upper edge of the discs 5 are shown as "soft", but with proper designing and positioning of the ligatures 9 and the necks 13 the edges of the discs 5 will move as in the case of Fig. 5. The upper edge of the discs 5 will move outward slightly as the lower edge and the intervening edge of the discs move inward during the initial installation of the gate in its valve body.

I find that the degree of hardness of the lower edge of the discs 5 with respect to the body seats 2 and 3 will vary under different degrees of construction of the gate, and also with respect to the size of the valves and, therefore, it is difficult to establish a standard difference for the degree of hardness of the gate with respect to the body seats, but I have found that for some of the smaller sizes of gate valves and with a reasonable and practical construction of the gate that if the angle E is about four minutes, the gate will give a proper seating relation with respect to the body seats 2 and 3.

In the valve body are formed oppositely disposed projecting ribs 14 which are positioned between the spaced wings 15 on opposite sides of the discs 5 and the ribs and wings 14 and 15 respectively form a guiding means for the gate when in a raised position and when it does not contact with the body seats 2 and 3 which then act as the guide for the gate.

It will be apparent in my disclosure that the gate herein described comprises two relatively movable discs each provided with a seating face to engage with the body seats 2 and 3 and in which the discs are integrally united by means of ligatures near their center although other point or points may be used, and in which the stem boss 7 is integrally united with each of the discs and that the lower edge of the discs on the gate are "hard" relative to the seats on the body and the edges of the discs will spring inwardly a decreasing amount so that the upper portion of the gate discs may move outwardly into a more intimate fit with the body seats when the gate is forced into its proper position with respect to the body member and that by integrally uniting the boss 7 with each of the discs 5 through a flexible neck member 13 the stress applied through the operating stem in moving the gate into and out of engagement with the body seats 2 and 3 will be caused to be equally divided between the two discs thereby bringing about a uniform condition in the operation of the gate. The movement of the top edges of the discs toward or away from each other is very slight or it may be eliminated entirely if desired.

There will be modifications to my invention which will suggest themselves to those skilled in the art after my description above as to the relation of and size of the different parts herein shown and described and other modifications which will fall within the scope of my invention, as, for instance, it is possible to form the faces 6 with relation to the seats 2 and 3, as shown in Fig. 5, and make the necks 13 unyielding thereby making all the adjustment between the faces below the ligatures 9, and this is possible because the difference between the faces 6 and faces 2 and 3 at the center of the ligatures 9 is quite small and the parts will yield sufficiently to form a tight seat; therefore, I do not wish to be limited other than by my claims.

I claim:

1. A valve gate comprising oppositely disposed seating discs, integrally formed and spaced members positioned between and uniting the discs and maintaining them at a fixed separation adjacent the center of the discs, a stem boss united to each disc by a yielding connection and seats formed on the outer faces of the discs.

2. A unitary valve gate comprising oppositely disposed discs having yieldable edges and having seating faces, the angle formed by the planes of the seating faces being different from the angle between the planes of the body seats with which the gate is to be used and means integrally connecting the discs at a distance from their edges.

3. A valve gate comprising oppositely disposed seating discs, an integrally formed member positioned between and uniting the discs and maintaining them at a fixed separation and a one-piece stem boss integrally united to each disc at a distance from the integrally formed member by a yielding connection.

4. A gate valve comprising a body having angularly disposed seats, a gate having a pair of spring valve discs each having a seating face adjacent its periphery to engage one of the body seats, a union connecting said spring valve discs, the seating faces disposed at an angle to each other differing from the angle formed by the body seats and means by which the body and gate may be moved relative to each other to open or close the valve.

5. A valve gate comprising oppositely disposed yielding seating discs integrally united, the planes of the seating faces of the discs forming a less angle with each other than the angle formed by the planes of the faces of the valve body seats.

6. A valve gate comprising oppositely disposed seating discs yieldingly united by an integral member at a distance from the edges of the discs, means uniting the discs each to a stem boss, the discs being adapted to engage with seats on the valve body and arranged to engage the body seats with their entering edges before they engage the body seats throughout their circumferences.

7. The combination of a valve body having oppositely disposed and spaced seats disposed in planes at an angle to each other, a valve gate comprising spaced discs provided with seats cooperating with the body seats, the gate seats disposed in planes at a less angle to each other than the body seats, means connecting the discs at a point distant from the edges of the discs and permitting relative movement of the discs and means integrally connecting each of the discs adjacent their edges to a boss adapted to receive actuating mechanism.

8. A gate valve comprising a body having oppositely disposed and inclined seats, a gate provided with spaced discs having oppositely disposed and inclined seats to engage the body seats and inclined at a different angle than the seats on the body, means integrally formed with the discs to maintain them in a spaced relation, means uniting each disc to a boss to receive an operating mechanism, the two said means permitting relative movement of the discs when the gate is moved into position until the angle of their seats coincides with the angle of the body seats.

9. A valve gate comprising a pair of spaced discs provided with exterior angularly disposed seating faces adapted to engage angularly disposed seats on a body member but disposed at a different angle, a pair of spaced ligatures integrally uniting the discs but permitting relative movement of the discs about the said ligatures and yielding means uniting each disc to a boss and arranged to receive operating mechanism.

10. The method of constructing a valve gate comprising forming a casting having two discs spaced apart and united along the greater portion of their edges and having integrally formed connecting means spaced from the edge and a boss integrally but yieldingly attached to the edge of each disc, then facing the discs to a predetermined angle and machining the boss to receive operating mechanism and then separating the discs from each other along their edge except where they connect to the boss.

11. The method of constructing a valve gate consisting in forming a casting having a pair of spaced discs united along their edges and having integrally formed connecting means spaced from the edges, then facing the discs to form machined seats thereon and then separating the edges of the discs where united to permit the edges to yield.

12. A valve gate comprising oppositely disposed seating discs integrally united in yielding relation, the discs adapted to engage with seats on a valve body and arranged to engage the body seats with their entering edges before they engage the body seats throughout their circumference and means to secure the gate to an operating stem.

13. The combination of a valve body with seats and a valve gate therefor and means to operate the gate, the valve gate comprising a unitary construction having oppositely disposed discs integrally united in a relatively yielding relation, the planes of the seating faces of the discs forming an angle with each other which is different from the angle formed by the planes of the faces of the body seats.

14. A unitary valve gate having discs with yielding rims, integrally formed means to maintain the discs in a fixed and spaced relation and means to connect the gate to an operating stem, the discs formed with seating faces to engage seating faces on a valve body and the discs so formed that their edges will yield when moved to a seating position in the valve body, the degree of yield varying from the entering edge of the discs to the diametrically opposite edge and being a maximum at the entering edge and a minimum at the opposite edge.

In testimony whereof I affix my signature.

EDWARD J. KILEY.